United States Patent [19]

Wilkinson et al.

[11] 3,933,545
[45] Jan. 20, 1976

[54] CONTROL OF LACE PRODUCTION

[75] Inventors: Kenneth Edward Wilkinson, Hertford, England; John Howard Davis, deceased, late of Hertford, England, by Barabara Davis, executrix; by Richard C. Harwood, executor, Chalfont St. Giles, England

[73] Assignee: Imperial Chemical Industries Limited, London, England

[22] Filed: May 29, 1974

[21] Appl. No.: 474,425

[30] Foreign Application Priority Data
June 6, 1973 United Kingdom............... 26983/73

[52] U.S. Cl. .................... 156/64; 118/8; 118/308; 118/405; 118/420; 156/356; 156/367; 156/378; 156/381; 427/10; 427/195; 427/358
[51] Int. Cl.$^2$....................... G01B 7/26; G01B 7/08
[58] Field of Search ............ 156/64, 356, 367, 381, 156/378; 117/DIG. 2, 19, 26, 9, 10, 11, 102 A, 115; 28/75 W; 118/405, 8, 420, 308

[56] References Cited
UNITED STATES PATENTS

| | | | |
|---|---|---|---|
| 3,098,780 | 7/1963 | Krause.................................. | 156/64 |
| 3,326,711 | 6/1967 | Spencer................................ | 117/11 |
| 3,503,784 | 3/1970 | Morita et al.......................... | 117/11 |

*Primary Examiner*—Edward G. Whitby
*Attorney, Agent, or Firm*—Cushman, Darby & Cushman

[57] ABSTRACT

A process for controlling the amount of polymer applied to a lace in which a powdered heat is applied to melt the polymer and the composite is passed through a die to consolidate the product and remove excess polymer, the control being effected by detecting the amount of excess molten polymer and automatically adjusting the polymer input. The process is also suitable for controlling the amount of polymer applied in a process for coating a lace.

6 Claims, 8 Drawing Figures

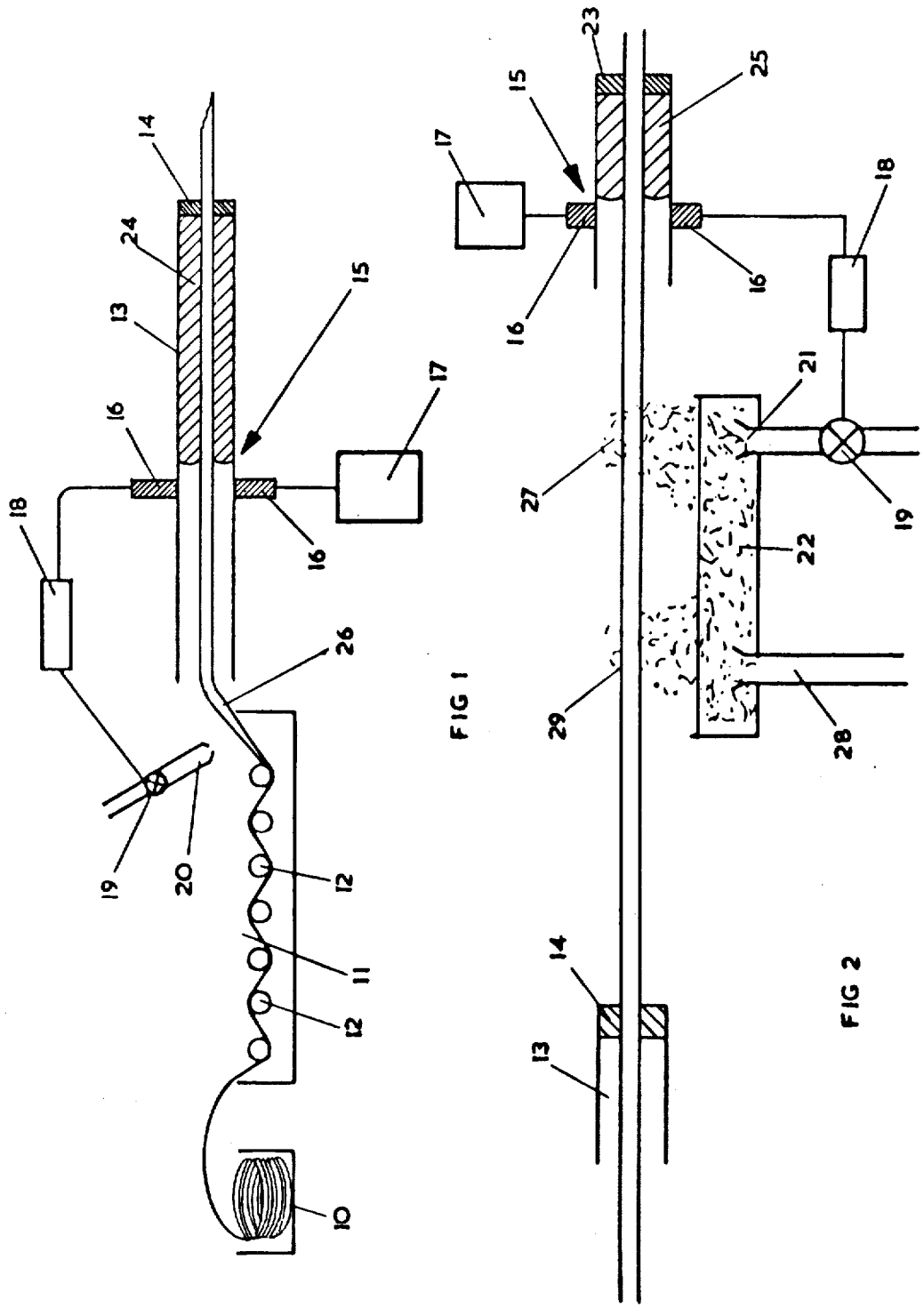

CONTROL OF LACE PRODUCTION

This invention relates to the control of polymeric lace production and in particular it relates to the control of polymer throughput in the production of laces.

It has recently been proposed to produce laces of a thermoplastic reinforced with a fibrous material by passing a roving impregnated with a thermoplastic polymer through a heated tube and then through a die to consolidate the product. A process of this nature has been published in the following patent specifications: German OLS 2 043 728 (Johns Manville) and OLS 2 117 095 (ICI); U.S. 3 586 560 (Eastman Kodak) and U.K. 1 295 085 and 1 295 084 (both Saint Gobain).

It has also been proposed (U.S. Pat. Application Ser. No. 381,090, filed July 20, 1973) to coat a lace with a layer of the same or a different thermoplastic polymer by applying the polymer in the form of a powder to the hot surface of the lace, passing the lace through a heated tube to melt at least the surface of the lace and then through a dye to consolidate the coating.

All of these documents imply that the process will operate satisfactorily on whatever amount of polymer is picked up at the input to the tube. It has now been discovered that the process is improved if the throughput of polymer is controlled.

According to the invention a lace is produced by drawing a lace precursor which includes powdered thermoplastic polymer through a heated tube to melt the polymer and then through a die to consolidate the product and remove excess polymer which accumulates as a melt pool in the tube, characterised in that the presence or absence of the melt pool at a suitable location in the tube is detected and the input of polymer is adjusted in accordance with the detection in such a manner that the quantity of polymer is reduced when "presence" is detected and/or the quantity of polymer is increased when "absence" is detected.

The invention includes two major applications. The first is the production of a fibre filled lace from a roving impregnated with a thermoplastic powder. In this application the adjustment of the input of polymer is most suitably achieved by depleting the surface layers of the impregnated roving when "presence" is detected. The depletion is conveniently carried out by directing an air jet at the impregnated roving.

The other major application is to the coating of an existing lace by a process comprising applying powder to the surface of a hot lace and thereafter treating as described above. In this application the adjustment is conveniently achieved by reducing or stopping the application of powder to the hot lace. It is convenient to apply the powder by directing a powder laden jet of air at the hot lace; this application is stopped by stopping the air jet.

As an alternative to the use of pneumatic systems extra powder may be sprinkled onto a lace precursor from a hopper. The control system is arranged to close the hopper when "presence" of the melt pool is detected.

In many cases a lace formed in the first process passes to the second for coating while it is still hot. In this case two control systems are desirable, i.e. one for each part of the process.

In a preferred embodiment of the invention the detection comprises measuring the capacitance of a capacitor having as dielectric the contents of the tube at the suitable location and adjusting the input of polymer in accordance with the measurement.

The invention also includes apparatus for carrying out the control method described above.

An apparatus for carrying out the control method described above comprises a tube terminating in a die and means for heating the tube, characterised in that a detector for molten polymer is positioned at a suitable location in the tube and that said detector is operationally connected to a controller for varying the quantity of polymer passing into the tube, e.g. a valve for adjusting (preferably on/off adjustment) an air stream which either removes polymer from, or applies polymer to, the feed entering the tube. A capacitor whose dielectric is the content of the tube at the desired location is a particularly suitable form of detector.

Where the detector is a capacitor and the controller is an electromagnetic valve for adjusting an air stream the operative connection most suitably takes the form of:

a. a signal generator, preferably a square wave generator, for feeding the capacitor;
b. an amplifier, preferably a charge amplifier, for amplifying the output of the capacitor, and
c. a trigger for producing a current to sensitise the valve depending on whether or not the output of (b) exceeds or is less than a pre-set value.

A preferred from of this circuit comprises two square wave generators synchronised out of phase, one generator being connected to the capacitor detector and the other to a compensation capacitor, the outputs of said capacitors being connected together and to the amplifying and trigger circuitry; the two generators and the two capacitors are balanced so that there is no signal to the amplifier in one state ("presence" or "absence") whereby the other state unbalances the circuit to give a signal.

The invention will now be described by way of example with reference to the accompanying drawings in which:

FIG. 1 is a diagrammatic view of a process for producing a glass fibre lace incorporating a control system according to the invention.

FIG. 2 is a diagrammatic view of a process for coating a lace incorporating the same control system as in FIG. 1.

Figure 3:
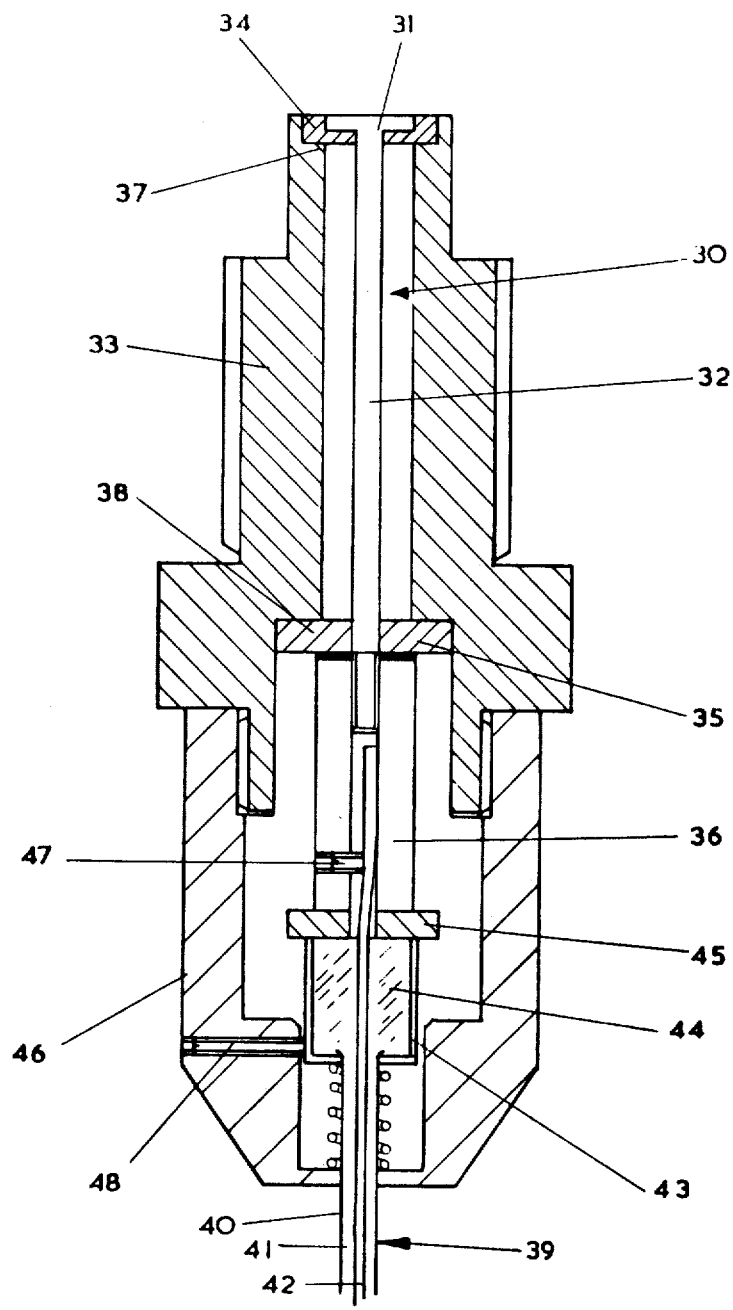
FIG. 3 is a cross-section of a detector element included in FIGS. 1 and 2.

As shown in FIG. 1, a glass roving is drawn from a bobbin 10 and into a fluidised bed 11 of powdered polypropylene. While it is in the bed 11 the roving passes under-and-over a series of seven bars 12. This opens the roving into bundles of filaments thereby allowing the powder to penetrate between the filaments to give a powder impregnated roving 26. This lace precursor 26 enters a tube 13 which is heated to above the melting point of the polypropylene. (The heater is not shown in any drawing.) When the polypropylene has melted the impregnated roving 26 passes through a die 14 which consolidates it into a lace which is cooled and cut into granules of fibre-reinforced polypropylene. The cooling and cutting are not shown in any drawing but the cutter includes the haul-off which pulls the rovings (and hence the lace precursor) through the process.

The process described in the last preceding paragraph is described in, and it forms the subject matter of, U.K. Pat. application 16512/70 which is published in Germany as OLS 2 117 095.

The present invention relates to the control system for the polymer throughput and the apparatus comprises a capacitance detector 15 (which is formed of two identical probes 16) situated near the open end of the tube 13. The dielectric constant of polypropylene is about 2 and hence the capacitance of the detector is double when the gap between its plates fills with molten polymer.

The capacitance detector is connected into a circuit which comprises a signal generator 17, the detector 15, measuring circuitry 18, and a solenoid valve 19 which controls the air supply to a nozzle 20. (The air supply is not shown but it is convenient to use the same source as for the fluidised bed.)

During use the roving picks up excess polymer in the bed 11 and the die 14 removes this excess which accumulates in the tube 13 as a molten pool 24. While the molten pool does not extend as far as the detector 15, i.e. there is "absence" at the detector, there is only a low (or zero) signal indicating "absence" passing from the detector 15 to the measuring circuitry 18 and the valve 19 remains closed, i.e. the air is shut off. When the pool 24 extends beyond the detector 15, i.e. there is "presence" at the detector, the signal increases, indicating "presence," and the measuring circuitry energises the valve 19. A jet of air from the nozzle 20 impinges on the impregnated rovings blowing off some polymer. The surface layers are depleted and this depletion is made good at the expense of the pool which therefore shrinks. When the pool no longer extends as far as the detector 15 the air jet switches off and the control cycle repeats.

The control system according to the invention maintains a substantially constant pool of polymer in the tube and this gives a lace of uniform composition. If no control system is used it may be necessary continually to feed excess polymer into the tube and this spills out of the end to give a dirty and wasteful process.

FIG. 2 shows the invention used to control the coating of a lace (in fact it illustrates the coating process of U.K. Pat. application 39411 of 1972) applied to the coating of the lace produced in FIG. 1. As described in the earlier patent application, the hot lace leaving the die 14 passes over a bath 22 of powdered polypropylene. An air jet from a nozzle 21 establishes a curtain 27 through which the lace passes and particles stick to its surface. This produces a second lace precursor which is reheated in a tube to melt its surface and the coating is made even by a die 23. The control system is as shown in FIG. 1, similar parts being given the same numerals, except that the nozzle 21 normally blows and it stops when its solenoid valve is energised. Stopping the air blast stops the feed of polymer powder to the tube 22 and hence causes the pool 25 of molten polymer to deplete until the polymer feed restarts. Thus the control system operates, as described with reference to FIG. 1, to produce a constant melt pool in the tube 25 and this results in an even coating on the lace.

As a modification the bath 22 has a second nozzle 28 which blows all the time to produce a permanent curtain of powder 29 which is adjusted to give an inadequate coating of powder. The nozzle 21 operates as described above and, when it blows, it augments the coating so that there is an excess.

In positioning the detector 15 the following criteria are important:

a. There must always be melt pool at the die end of the tube; preferably there should always be at least 5 cm or better at least 10 cm of melt pool.

b. The melt pool should not be too long or there will be excessive degradation of the polymer. Preferably the melt pool should be less than 100 cm long and better less than 30 cm long especially in the coating process.

c. The tube should project beyond the longest melt pool allowed by the control system. Clearly polymer will be wasted if the tube is too short.

The construction of the probes, identified as 16 in FIGS. 1 and 2, is illustrated in FIG. 3.

The probe comprises a stainless steel electrode 30 which has an end-plate 31 (forming one plate of a capacitor during use) and a stem 32. The electrode 30 is supported in a casing 33 by means of asbestos washers 34 and 35 and a hexagonal retaining member 36 which screws onto the stem 32. This compresses the washers 34 and 35 forcing them into engagement with shoulders 37 and 38 so that the electrode is firmly held in the casing 33 but electrically insulated therefrom. Leaks between the washer 34 and the casing 33 or the electrode 31 are sealed by a suitable cement.

The electrode 30 is connected to a (conventional) connector 39 which comprises a sheath 40 (in the form of a robust copper tube) containing compressed powdered alumina as insulant 41 and a copper conductor 42 embedded in the insulant 41. The end of the connector 39 is closed with a self tapping cylinder 43 which is filled with glass 44 (added in the molten state) leaving the conductor 42 projecting. The conductor is connected to the member 36 by means of a grub screw 47 and the sheath 40 is insulated from the member 36 by means of an asbestos washer 45.

A screw cap 46 is fitted onto the casing 33 and the sheath 40 is secured to the cap 46 by means of a lockscrew 48.

It is emphasised that the arrangement meets the following requirements:

1. The electrode and its conductor are screened over their whole length.

2. All parts are mechanically robust and heat resistant.

Figure 4:
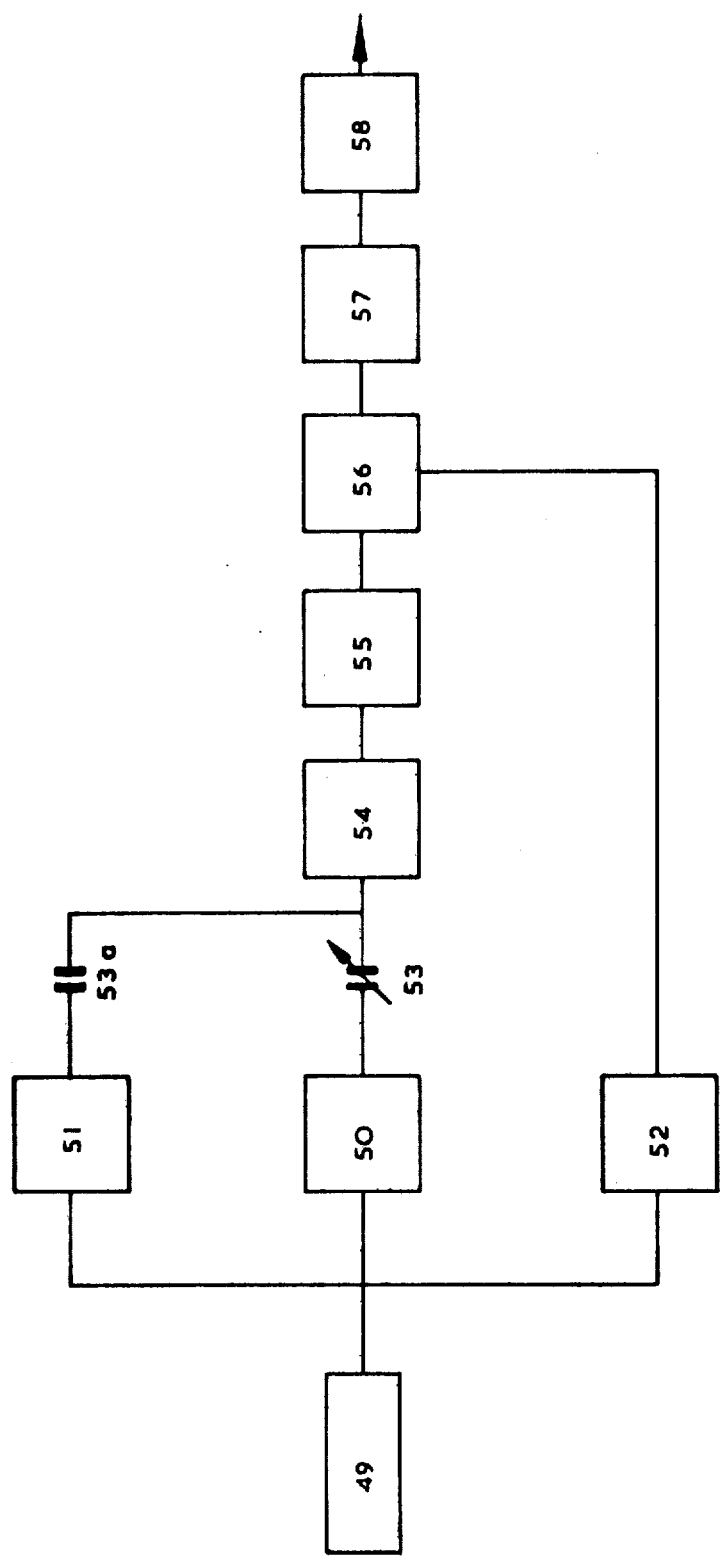
FIG. 4 is a block diagram of the electronics used in FIGS. 1 and 2.

In use two probes screw into suitable sockets as shown in FIG. 1 or FIG. 2. The two probes form a capacitor which is variable by reason of changes in its dielectric. This variable capacitor is connected into the circuit illustrated in FIG. 4.

The circuit comprises a primary signal generator 49 (which produces a 1KHz square wave of about 12v amplitude) connected to three secondary signal generators as follows:

a. A 100v chopper 50 which produces a square wave of 100v amplitude out of phase with the primary signal.

b. A low voltage chopper 51 which produces a square wave in phase with the primary signal. The choper 51 is adjustable so that its output can be set within the range 0.1v to 1v amplitude.

c. A synchronous pulse generator 52 which produces short pulses at the centre of the pulses of the primary signal (i.e. half way between the pulses from (a).

Figure 5:
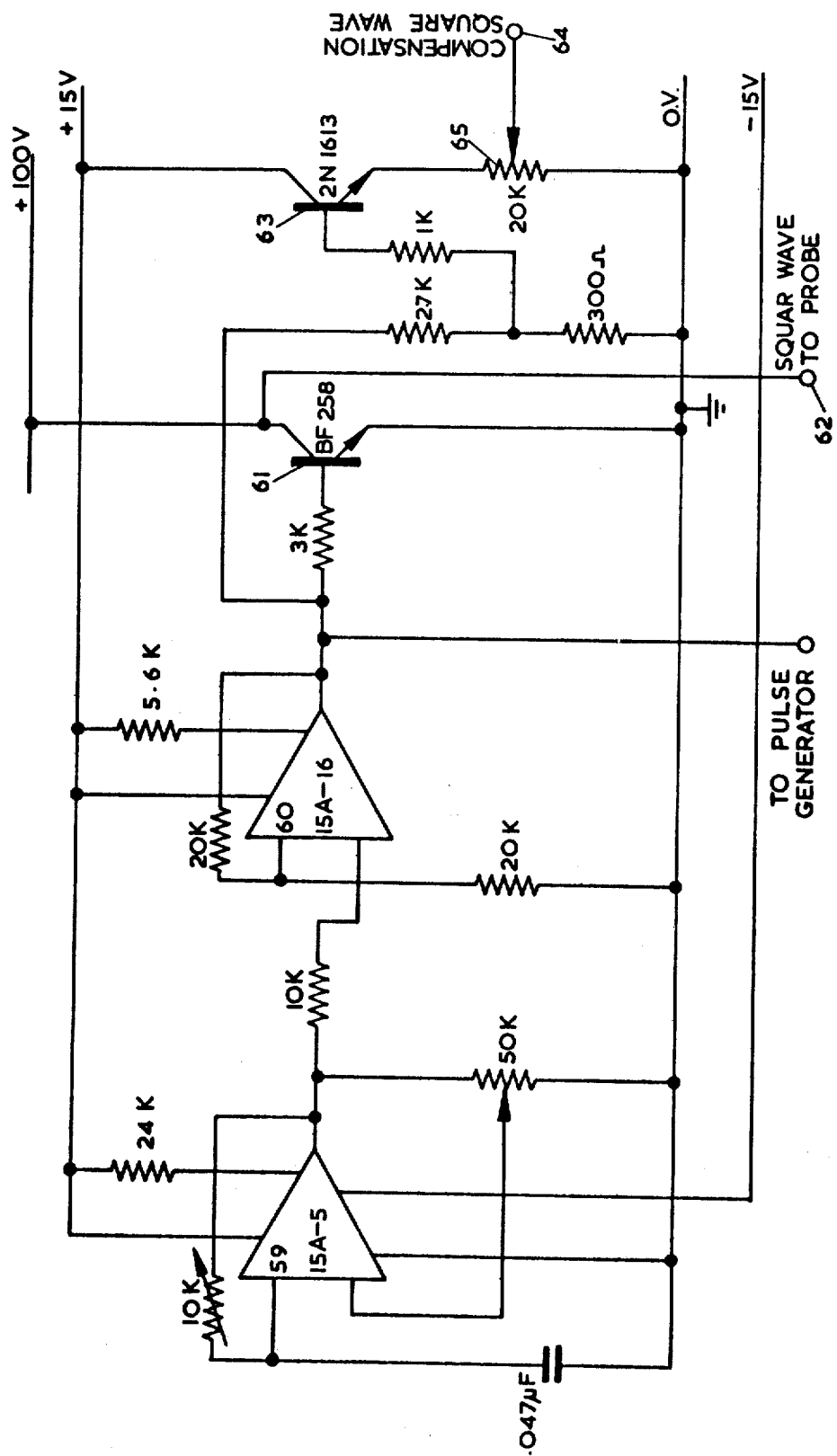
FIG. 5 to 8 are circuit diagrams of the blocks shown in FIG. 4.

The circuits of the signal generators 49, 50 and 51 are shown in FIG. 5.

The primary signal generator 49 is formed of an amplifier 59 with the feedback network shown. The output of the signal generator 49 is buffered by the amplifier 60.

The 100v chopper 50 is formed of the transistor 61 which when conductive gives an output of 0v at 62 and when non-conductive gives an output of 100v.

The adjustable chopper 51 is formed of transistor 63 which gives an output of 0v at 64 when non-conductive and a voltage adjustable by the potentiometer 65 when the transistor 63 is conductive.

It is emphasised that both transistors 61 and 63 received the same control pulses from the amplifier 60 and hence the conductive and non-conductive states are synchronised. Thus the wave chains at 62 and 64 are out of phase with one another. In addition rising edges at 62 coincide with falling edges at 64 and vice versa.

Figure 6:
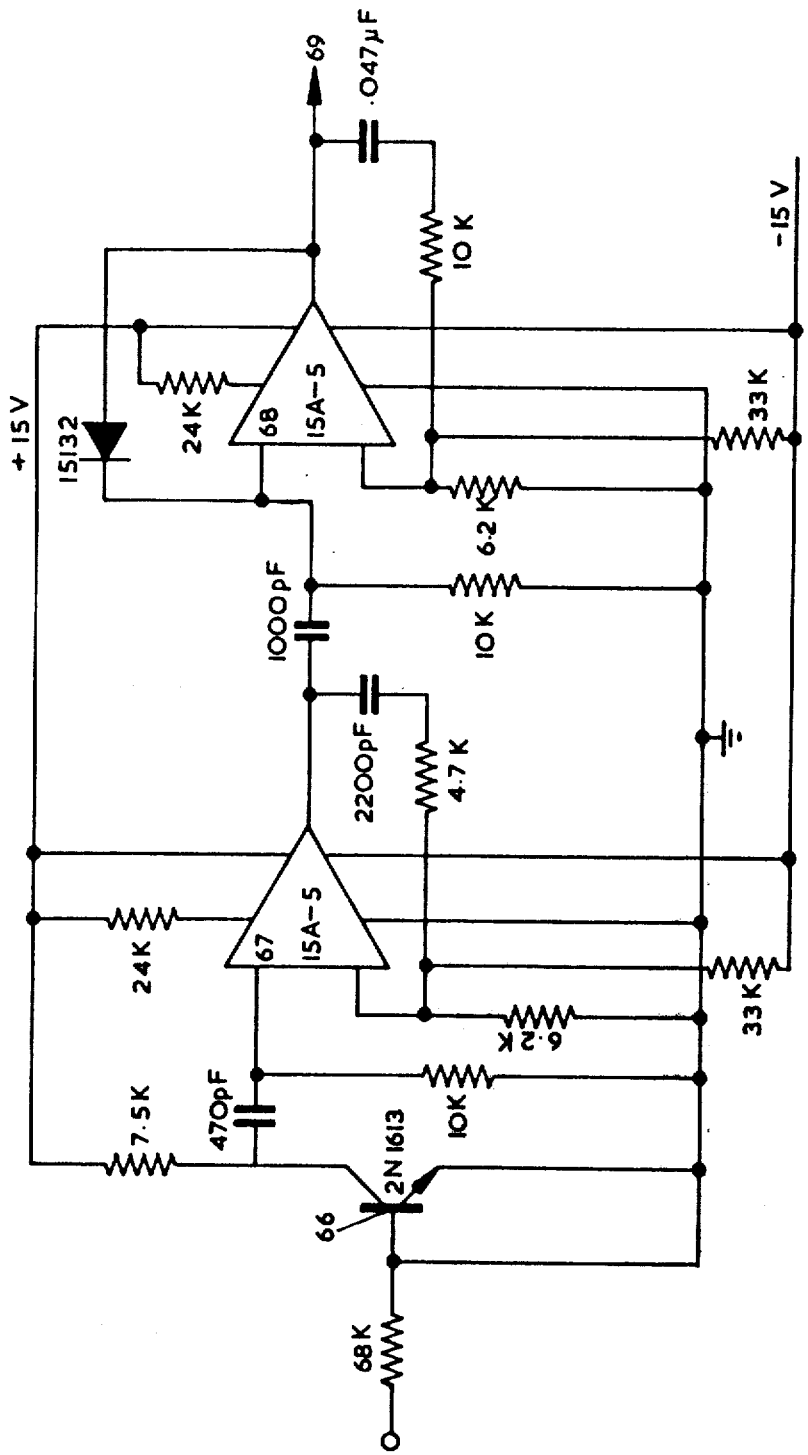

The circuit of the synchronous pulse generator 52 is shown in FIG. 6. The transistor 66 changes the phase of the primary wave chain and this modified signal is fed to the amplifier 67 and its associated circuitry. The falling edges trigger half-length pulses which pass to the amplifier 68 and the falling edge of the half-length pulses trigger short pulses which are available at 69.

Figure 7:
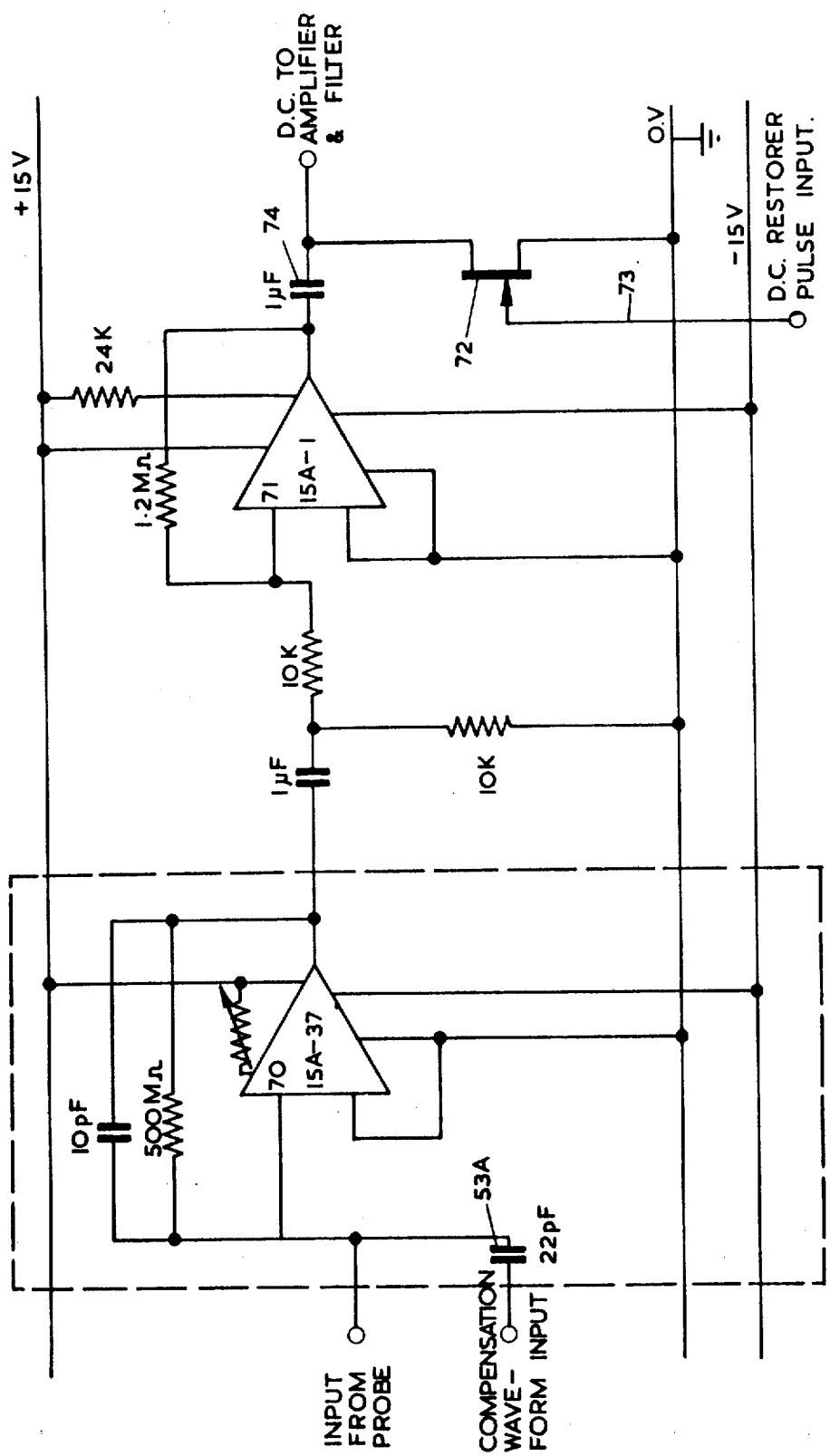
Figure 8:
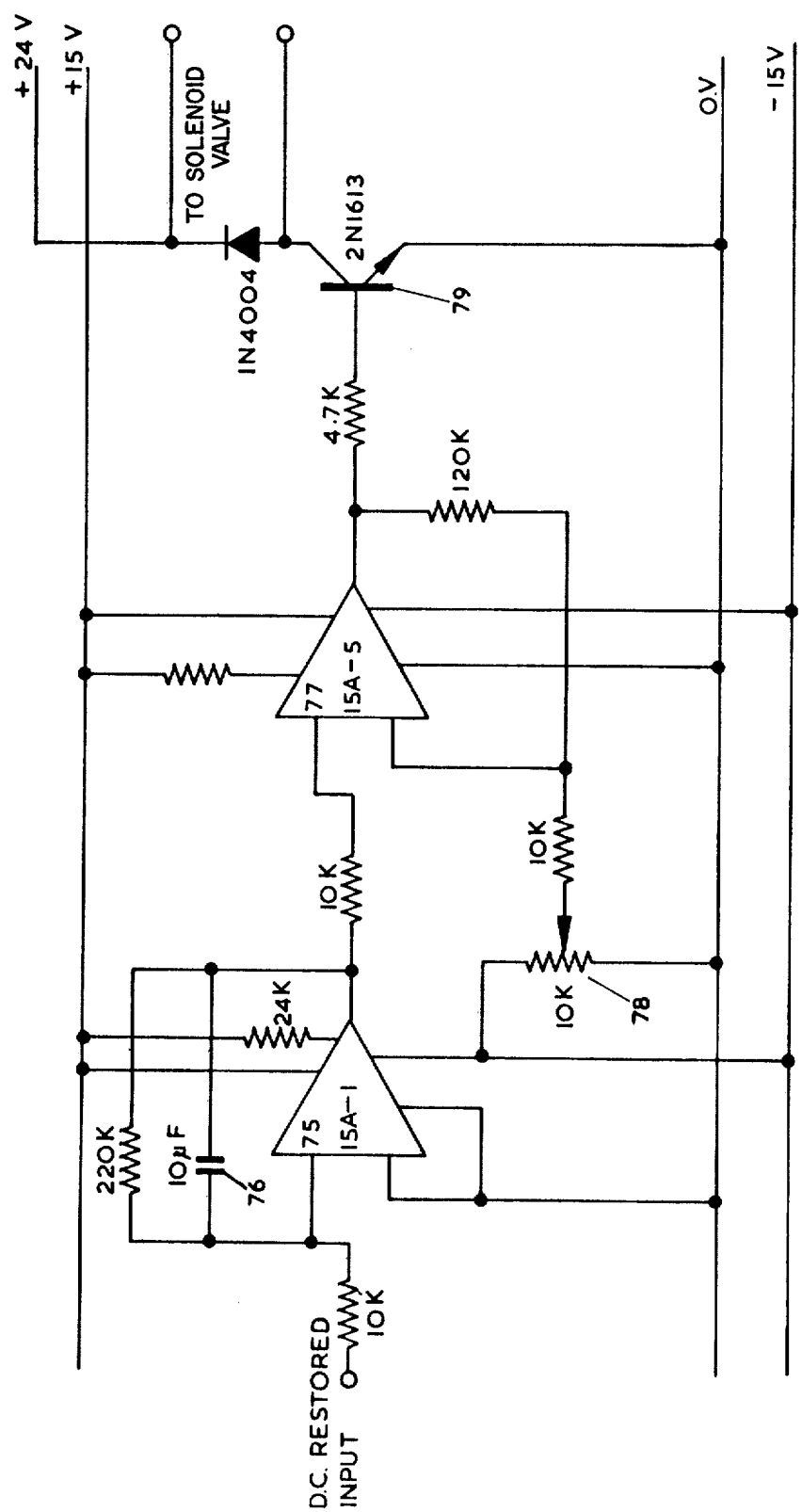

Returning now to FIG. 4, the 100v chopper 50 is connected to the variable capacitor 53 (i.e. the detector 15) and the adjustable chopper 51 is connected to the compensation capacitor 53a. The outputs of the two capacitors are joined together and to a series which comprises:

i. Charge amplifier 54 (whose circuit is shown in FIG. 7 as amplifier 70 together with its associated circuitry). The charge amplifier 54 is screened to prevent the pick up of unwanted signals).

ii. AC amplifier 55 (amplifier 71 of FIG. 7).

iii. DC restorer 56 which establishes the signal at zero volts when it receives a timing pulse from generator 52, (in FIG. 7 the DC restorer 56 is FET transistor 72 which receives the timing pulse via line 73. When pulsed the FET transistor becomes a low resistance to discharge capacitor 74.)

iv. DC amplifier/smoother 57 (amplifier 75 and capacitor 76), v. Comparator 58 which flips from negative to positive when its input signal from amplifier 57 exceeds a pre-set value. (The comparator is formed of amplifier 77, which is set by potentiometer 78, and the output of which goes to power transistor 79.)

The operation of the circuit is as follows. The voltage of the adjustable chopper 51 is adjusted so that the voltages applied to the capacitors 53 and 53a are inversely proportional to their capacitances. This means that each requires the same charge but in different parts of the cycle (since the two pulse chains are out of phase). As rising and falling edges coincide the charge flows backwards and forewards between the two capacitors and there is no signal to the charge amplifier 54.

In use the equipment is set up and the potentiometer 65 is adjusted to give minimum signal when the detector 15 (capacitor 53) contains no melt pool. When the detector 15 (i.e. the capacitor 53) contains melt pool its capacitance increases and it acquires more charge when the voltage is applied. Thus the circuit is unbalanced and there is a signal which, after processing, is received by the amplifier 77. The potentiometer is received by the amplifier 77. The potentiometer 78 is adjusted so that the amplifier 77 gives an output for half this signal and this output operates the solenoid valve 19.

The most significant noise in the circuit arises from electrostatic charges in the polymer which are picked up as a low frequency signal. The DC restoration at block 56 removes the effect of this noise in blocks 57 and 58.

The ultimate output of the circuit is the power to energise the valve 19; as is specified in FIG. 1 the valve 19 blows when energised; in FIG. 2 it stops when energised. Both arrangements are conveniently achieved with the same components by using a three port valve (i.e. one inlet and two outlets) which blows through one outlet port when energised and through the other outlet port when de-energised. If on/off valves are used it is necessary to use different types for FIGS. 1 and 2 or else an inverter must be added in the input to transistor 79 for FIG. 2 in one case.

In most applications several laces are made in close proximity and each lace requires two control systems. Each control system requires its own blocks 53 to 58 but blocks 49 to 52 may be shared by all the systems. FIG. 5 requires modification in that there must be a separate potentiometer 65 for each control system. This means that instead of a single resistor 65 there are several in parallel.

We claim:

1. A process for the production of a lace by drawing a lace precursor which includes powdered thermoplastic polymer through a heated tube to melt the polymer and then through a die to consolidate the product into lace and remove excess polymer which accumulates as a melt pool in the tube, said process including the further steps of detecting the presence or absence of the melt pool at a suitable location in the tube and correspondingly adjusting the input of polymer to the lace precursor so that the amount of polymer is varied depending on whether molten polymer is present or absent at the chosen location whereby a lace of uniform composition is produced and wastage of polymer is minimized.

2. A process according to claim 1 in which the lace precursor is a roving impregnated with a thermosplastic powder.

3. A process for the production of a coated lace comprising preparing a lace according to claim 2, applying further thermoplastic polymer powder to the surface of said lace while said lace is still hot, drawing said lace with the further polymer powder thereon through a second heated tube to melt the powder and then through a second die to consolidate the product and form said coated lace and remove excess polymer which accumulates as a further melt pool in the second tube, detecting the presence or absence of said further metal pool at a location in said second tube and correspondingly adjusting the input of further polymer powder to said lace so that the amount of further polymer is varied depending on whether polymer is present or absent at the location in said second tube whereby a coated lace of uniform composition is produced and wastage of polymer is minimized.

4. A process according to claim 1 in which the lace precursor is a previously formed lace comprising roving which has been impregnated with a thermoplastic powder, passed through a heated tube to melt the powder and consolidated by passing through a die.

5. A process according to claim 1 in which the adjustment of the input of polymer in accordance with said detection step is accomplished by using an air jet to appropriately vary the amount of polymer attached to the lace precursor.

6. A process according to claim 1 in which detection of the presence or absence of the melt pool is effected by measuring the capacitance of a capacitor having as dielectric the content of the tube at the suitable location and adjusting the polymer input accordingly.

* * * * *